United States Patent
Strasser

(10) Patent No.: US 8,196,161 B2
(45) Date of Patent: Jun. 5, 2012

(54) PROCESSING DIGITAL TELEVISION PROGRAMS AT A RECEIVER SO AS TO PREVENT INTERCEPTION OF UNSCRAMBLED PROGRAMS

(75) Inventor: David A. Strasser, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 1041 days.

(21) Appl. No.: 11/054,470

(22) Filed: Feb. 9, 2005

(65) Prior Publication Data

US 2006/0176909 A1    Aug. 10, 2006

(51) Int. Cl.
H04N 7/167    (2011.01)

(52) U.S. Cl. .......................................... 725/31; 380/210

(58) Field of Classification Search .................... 725/25, 725/31

See application file for complete search history.

(56) References Cited

U.S. PATENT DOCUMENTS

| | | | |
|---|---|---|---|
| 6,229,801 B1 * | 5/2001 | Anderson et al. ............. | 370/349 |
| 6,804,259 B1 * | 10/2004 | Onagawa ...................... | 370/476 |
| 6,970,482 B2 * | 11/2005 | Kim .............................. | 370/542 |
| 7,024,683 B1 * | 4/2006 | Gee, Jr. ......................... | 725/132 |
| 7,050,436 B1 * | 5/2006 | Gurney ......................... | 370/394 |
| 7,221,684 B1 * | 5/2007 | Smith et al. .................. | 370/477 |
| 7,412,715 B2 * | 8/2008 | Kim et al. ..................... | 725/38 |
| 2002/0067718 A1 * | 6/2002 | Coupe et al. ................. | 370/389 |
| 2002/0146125 A1 * | 10/2002 | Eskicioglu et al. .......... | 380/255 |
| 2003/0172326 A1 * | 9/2003 | Coffin et al. ................. | 714/699 |
| 2005/0044201 A1 * | 2/2005 | Suzuki et al. ................ | 709/223 |
| 2005/0091697 A1 * | 4/2005 | Tanaka et al. ................ | 725/131 |

OTHER PUBLICATIONS

U.S. Federal Communications Commission (FCC), Second Report and Order and Second Further Notice of Proposed Rulemaking, adopted on Sep. 10, 2003 and released on Oct. 9, 2003. hraunfoss.fcc.gov/edocs_public/attachmatch/FCC-03-225A1.pdf.
Society of Cable Telecommunications Engineers, Host-Pod Interface Standard, ANSI/SCTE 28 2004, www.scte.org/documents/pdf/ANSISCTE282004.pdf.
U.S. Federal Communications Commission (FCC), Report and Order and Further Notice of Proposed Rulemaking. adopted and released on Nov. 4, 2003, hraunfoss.fcc.gov/edocs_public/attachmatch/FCC-03-273A1.pdf.
Opencable Cablecard™, Interface Specification, Nov. 19, 2004, www.opencable.com/downloads/specs/OC-SP-CC-IF-I18-041119.pdf.

* cited by examiner

*Primary Examiner* — Joseph P Hirl
*Assistant Examiner* — Hyun Hong
(74) *Attorney, Agent, or Firm* — Faegre Baker Daniels LLP

(57) ABSTRACT

When a stream of packets (e.g. MPEG-2 transport stream) includes certain packets representing unscrambled digital television program content and certain other packets representing the content of a scrambled digital television program that is currently tuned by a receiver, interception of the unscrambled digital television program at an output of the receiver may be prevented by determining whether packets representing program content have an ascertained characteristic (e.g. have a packet ID matching one of a set of packet IDs) that uniquely identifies the packets as representing content of the scrambled program. For packets not having the characteristic, delivery to the output of the digital television receiver in an unscrambled state may be prevented, e.g., by discarding the packet or by overwriting its payload.

22 Claims, 3 Drawing Sheets

PROCESSING DIGITAL TELEVISION PROGRAMS AT A RECEIVER SO AS TO PREVENT INTERCEPTION OF UNSCRAMBLED PROGRAMS

FIELD OF THE INVENTION

The present invention relates to digital television (DTV), and more particularly to processing digital television programs at a receiver so as to prevent interception of unscrambled programs.

BACKGROUND OF THE INVENTION

In the United States, the Telecommunications Acts of 1992 and 1996 require that cable subscribers be given the option of owning the equipment required to receive cable services. To support competition in the market for so-called "host" devices (i.e. DTV receivers such as set-top boxes or integrated digital televisions), a Report and Order of the U.S. Federal Communications Commission (FCC) adopted on Sep. 10, 2003 and released on Oct. 9, 2003 entitled "Second Report and Order and Second Further Notice of Proposed Rulemaking" (referred to as the "Digital Cable Plug and Play Report and Order"), which is available at World Wide Web address hraunfoss.fcc.gov/edocs_public/attachmatch/FCC-03-225A1.pdf and is hereby incorporated by reference hereinto, requires that cable operators make available security modules which are separable from host devices.

To satisfy the government's separable security requirements and to enable retail availability of host devices, point-of-deployment (POD) security modules have been developed. A POD security module (also known as a "POD module" or simply a "POD") is a hardware device (with embedded firmware) provided by a cable provider which is intended to be plugged into a host device (or simply "HOST") to facilitate the display of digital television programs that are otherwise protected by the cable provider's conditional access (CA) scrambling system. When a POD module is plugged into a host device designed to receive such a module, subscribers are able to view the secure digital video services and/or listen to audio services for which they have subscribed, which services may include premium subscription channels. POD modules are sometimes referred to by the trademark CableCARD™. Physically, a POD module may be a Personal Computer Memory Card International Association (PCMCIA) card or a smart card device, both of which are approximately the same size as a credit card (although PCMCIA cards are thicker than a credit card).

POD modules serve two functions. First, the POD module acts as a descrambler, allowing the cable provider to be assured that the host device at the subscriber premises is a secure device without which scrambled content will be unviewable. Second, the POD module acts as a translator between the possibly varying out-of-band (OOB) protocols used on different cable provider networks and a single protocol (described below) that is expected by the host device. In other words, by virtue of the POD translation, the host device is only required understand a single protocol, regardless of the OOB protocol(s) that may be operative on the cable provider network to which the host device is connected. Thus in the event of switching between cable providers or moving between different geographical areas, a subscriber should be able to continue using the same host device, provided that a new POD module is obtained from the new cable provider and plugged into to the host device. As well, this arrangement permits a cable provider to upgrade its network head-end without having to replace numerous set-top boxes at subscriber premises. The cable operator need only provide replacement POD modules in the event of an upgrade.

In a typical arrangement, a cable provider receives programming from various sources at its head-end and assigns it to channels. Each channel is a unique 6 megahertz (MHz) section of the cable provider's bandwidth which carries either a modulated digital signal that has been compressed or a modulated NTSC signal. At present, the standard most commonly used for compression is the MPEG-2 standard. MPEG-2 is a well-known multimedia compression and delivery standard developed by the Motion Picture Experts Group. The format of the MPEG-2 transport stream is in accordance with the ISO/IEC 13818-1 "MPEG-2 Systems" standard. The numerous 6 MHz channels are then transmitted over cables simultaneously to subscribers in the form of an analog radio frequency (RF) signal.

At the host device, an RF signal is received by a tuner within the host device. Depending upon the television channel selected by the subscriber (e.g. via a handheld remote control device), the tuner isolates one of the 6 MHz channels comprising the received signal and converts it to a fixed lower frequency. The output of the tuner is an analog signal representative of the tuned channel. This is referred to as a Forward Application Transport (FAT) channel.

The FAT channel is presented to a Quadrature Amplitude Modulation (QAM) demodulator within the host device. As is known in the art, a QAM demodulator converts the analog FAT channel to a baseband MPEG-2 transport stream, which is a stream of (digital) packets. A subset of the packets of this stream represent the program content that is to be viewed by the subscriber (with the remaining packets consisting of control packets, "metadata" packets containing information about the network, and possibly other program content, as will be described).

In order to prevent unauthorized viewing of subscription channels, programs transmitted by way of MPEG-2 transport streams are typically scrambled by the cable provider using a conditional access scrambling system. This is typically done for all but basic tier cable channels. The term "scrambling" is a legacy term which historically describes a technique developed in the 1970s whereby an analog cable television channel was reduced to a jumbled set of video images through removal of a synchronization signal or insertion of an interfering signal at the network head-end. In the digital MPEG-2 transport stream, it is more accurate to refer to a program as being "encrypted" rather than "scrambled", since digital encryption techniques (not the above-described approach) are now employed to encrypt packets. However, the term "scrambled" is still commonly used to refer to this network head-end encryption, and the term "descramble" is still used to describe decryption of this encrypted program.

If a program comprising the MPEG-2 transport stream is scrambled, the MPEG-2 transport stream is forwarded to the POD module via the "HOST-POD interface." The HOST-POD interface is an interface governed by a standard known as the ANSI/SCTE 28 2004 HOST-POD Interface Standard. This standard defines the physical interface, signal timing, link interface and application interface of the HOST-POD interconnection (i.e. the interconnection between the POD module and the host device). The ANSI/SCTE 28 2004 HOST-POD Interface Standard was developed by the American National Standards Institute and the Society of Cable Telecommunications Engineers. It is available at www.scte.org/documents/pdf/ANSISCTE282004.pdf, and is hereby incorporated by reference hereinto.

Assuming that a POD module is plugged into the host device, the MPEG-2 transport stream output by the QAM demodulator is received at the POD module. At the POD module, two steps are performed. First, the scrambled program within the MPEG-2 transport stream received from the host device is descrambled (i.e. decrypted). Second, the content is "copy protection" (CP+) re-encrypted and is provided back to the host device over the HOST-POD interface. The purpose of this re-encryption is to avoid unencrypted content from being transmitted, and possibly intercepted, between the POD module and the host device. Re-encryption may be performed using the Data Encryption Standard (DES). DES is defined in U.S. National Institute of Standards and Technology (NIST) Federal Information Processing Standards (FIPS) Publication 46-3 (Electronic Code Book mode of operation), which is hereby incorporated by reference hereinto. DES is a method of data encryption which uses a private (secret) key that must be known and used by both the sender and the receiver of the data. Packets representing minor channels that are not currently being viewed are passed from the POD module back to the host device unaltered.

At the host device, the CP+ encrypted MPEG-2 transport stream is received at a transport demultiplexer. Using the appropriate key, the transport stream is decrypted, and elementary audio and video streams of the tuned channel are extracted and forwarded to MPEG audio and video decoders for ultimate conversion to sound by speakers and display as moving images on a screen (respectively). In some cases, a IEEE 1394 data link device may transfer the compressed program to other devices (the number "1394" refers to the Institute of Electrical and Electronics Engineers (IEEE) 1394 standard, which is a well-known bus standard).

In the event that the program tuned in by the subscriber has not been scrambled by the cable provider, however, the HOST-POD interface is bypassed, and the MPEG-2 transport stream is instead transmitted directly from the QAM demodulator to the transport demultiplexer. In this case the transport demultiplexer need not perform any CP+ decryption on the transport stream. The bypassing of the HOST-POD interface is mandated by a Report and Order of the FCC entitled "Report and Order and Further Notice of Proposed Rulemaking" adopted and released on Nov. 4, 2003 (referred to as the "Broadcast-Protection Report and Order"), which is available at World Wide Web address hraunfoss.fcc.gov/edocs_public/attachmatch/FCC-03-273A1.pdf. An objective of the Broadcast-Protection Report and Order is to prevent unscrambled content from being presented at an output of a host device.

In view of the MPEG-2 compression applied at the network head-end, which increases the amount of data that can be transmitted by way of a single 6 MHz analog channel as compared to traditional analog transmission, and in view of the various formats (as enumerated in Table 1 below) that are supported by digital television standards, each 6 MHz analog channel (referred to as a "major" channel) may actually consist of multiple "sub-channels" (referred to as "minor" channels). Each sub-channel may carry a different television program. The term "program" as used herein refers to a single stream of content including video, audio and related data. A program may of course include advertisements (i.e. commercials) in addition to scheduled shows.

TABLE 1

DTV Formats

| Format | Characteristics |
|---|---|
| 480i | The picture is 704 × 480 pixels, sent at 60 interlaced frames per second (30 complete frames per second). |
| 480p | The picture is 704 × 480 pixels, sent at 60 complete frames per second. |
| 720p | The picture is 1280 × 720 pixels, sent at 60 complete frames per second. |
| 1080i | The picture is 1920 × 1080 pixels, sent at 60 interlaced frames per second (30 complete frames per second). |
| 1080p | The picture is 1920 × 1080 pixels, sent at 60 complete frames per second. |

For clarity, the "p" and "i" in Table 1 are abbreviations for "progressive" and "interlaced" respectively. In a progressive format, the full frame updates up to every sixtieth of a second. In an interlaced format, half of the picture (i.e. a "field" comprising every other scan line of a display) is updated every sixtieth of a second. The 480p and 480i formats are known as standard definition (SD) formats, with 480i being roughly equivalent to a traditional analog TV picture. The 720p, 1080i and 1080p formats are referred to as high definition (HD) formats, otherwise known as "HDTV".

Thus, a cable provider wishing transmit multiple programs over a single 6 MHz channel (known as "multicasting") may for example transmit several SD minor channels over the major channel.

When a subscriber tunes into a scrambled (i.e. encrypted) minor channel within a major channel, the MPEG-2 transport stream representing the entire major channel—including all of the contained minor channels, even those which are not being viewed—is transmitted to the POD module via the HOST-POD interface. The POD module performs its descrambling and CP+encryption on only the minor channel of interest. If any of the other minor channels are not scrambled, those channels will be transmitted to the POD module in unscrambled form and back from the POD module in unscrambled form. This may disadvantageously permit an enterprising subscriber to access minor channels in an unencrypted form at the HOST-POD interface. Moreover, assuming that the unscrambled channels have been designated with a Redistribution Control (RC) descriptor indicating that the channels are not to be output at a digital output (e.g. a IEEE 1394, Ethernet or wireless output) without enabling protection technology associated with that digital output, such transmission of unscrambled content over the HOST-POD interface would also be in violation of the FCC's Broadcast-Protection Report and Order.

A solution which addresses at least some of the above noted disadvantages would be desirable.

SUMMARY OF THE INVENTION

When a stream of packets (e.g. MPEG-2 transport stream) includes certain packets representing unscrambled digital television program content and certain other packets representing the content of a scrambled digital television program that is currently tuned by a receiver, interception of the unscrambled digital television program at an output of the receiver may be prevented by determining whether packets representing program content have an ascertained characteristic (e.g. have a packet ID matching one of a set of packet IDs) that uniquely identifies the packets as representing content of the scrambled program. For packets not having the characteristic, delivery to the output of the digital television receiver in an unscrambled state may be prevented, e.g., by discarding the packet or by overwriting its payload.

In accordance with an aspect of the present invention there is provided a method of processing digital television programs at a receiver, comprising: receiving a digital stream containing a first set of packets representing content of a scrambled program currently tuned by the receiver and a second set of packets representing content of an unscrambled program, the receiving resulting in a received stream; filtering the received stream to form a filtered stream to be provided to a descrambler, the filtered stream containing the first set of packets and lacking at least the payloads of at least some of the second set of packets, thereby preventing interception of the unscrambled program at an interface to the descrambler; and providing the filtered stream to the descrambler via the interface for descrambling the scrambled program.

In accordance with another aspect of the present invention there is provided a method of processing digital television program signals at a receiver, comprising: receiving a stream of packets representing a plurality of channels, one of the plurality channels carrying a first set of packets representing a scrambled program currently tuned by the receiver, another of the plurality channels carrying a packets representing an unscrambled program; determining a set of packet identifiers (PIDs) which uniquely identifies the first set of packets, the determining resulting in a determined set of PIDs; filtering the stream to form a filtered stream to be provided to a descrambler, the filtered stream containing packets whose PIDs are in the determined set of PIDs and lacking at least the payloads of at least some of the packets whose PIDs are not in the determined set of PIDs, thereby preventing interception of the unscrambled program at an interface to the descrambler; and providing the filtered stream to the descrambler via the interface for descrambling the scrambled program.

In accordance with yet another aspect of the present invention there is provided a machine-readable medium including code for processing digital television programs at a receiver, comprising: machine-executable code for receiving a digital stream containing a first set of packets representing content of a scrambled program currently tuned by the receiver and a second set of packets representing content of an unscrambled program, the receiving resulting in a received stream; machine-executable code for filtering the received stream to form a filtered stream to be provided to a descrambler, the filtered stream containing the first set of packets and lacking at least the payloads of at least some of the second set of packets, thereby preventing interception of the unscrambled program at an interface to the descrambler; and machine-executable code for providing the filtered stream to the descrambler via the interface for descrambling the scrambled program.

In accordance with still another aspect of the present invention there is provided a receiver operable to process digital television programs, comprising: a filtering engine for: receiving a digital stream containing a first set of packets representing content of a scrambled program currently tuned by the receiver and a second set of packets representing content of an unscrambled program, the receiving resulting in a received stream; filtering the received stream to form a filtered stream to be provided to a descrambler, the filtered stream containing the first set of packets and lacking at least the payloads of at least some of the second set of packets, thereby preventing interception of the unscrambled program at an interface to the descrambler; and providing the filtered stream to the descrambler via the interface for descrambling the scrambled program.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
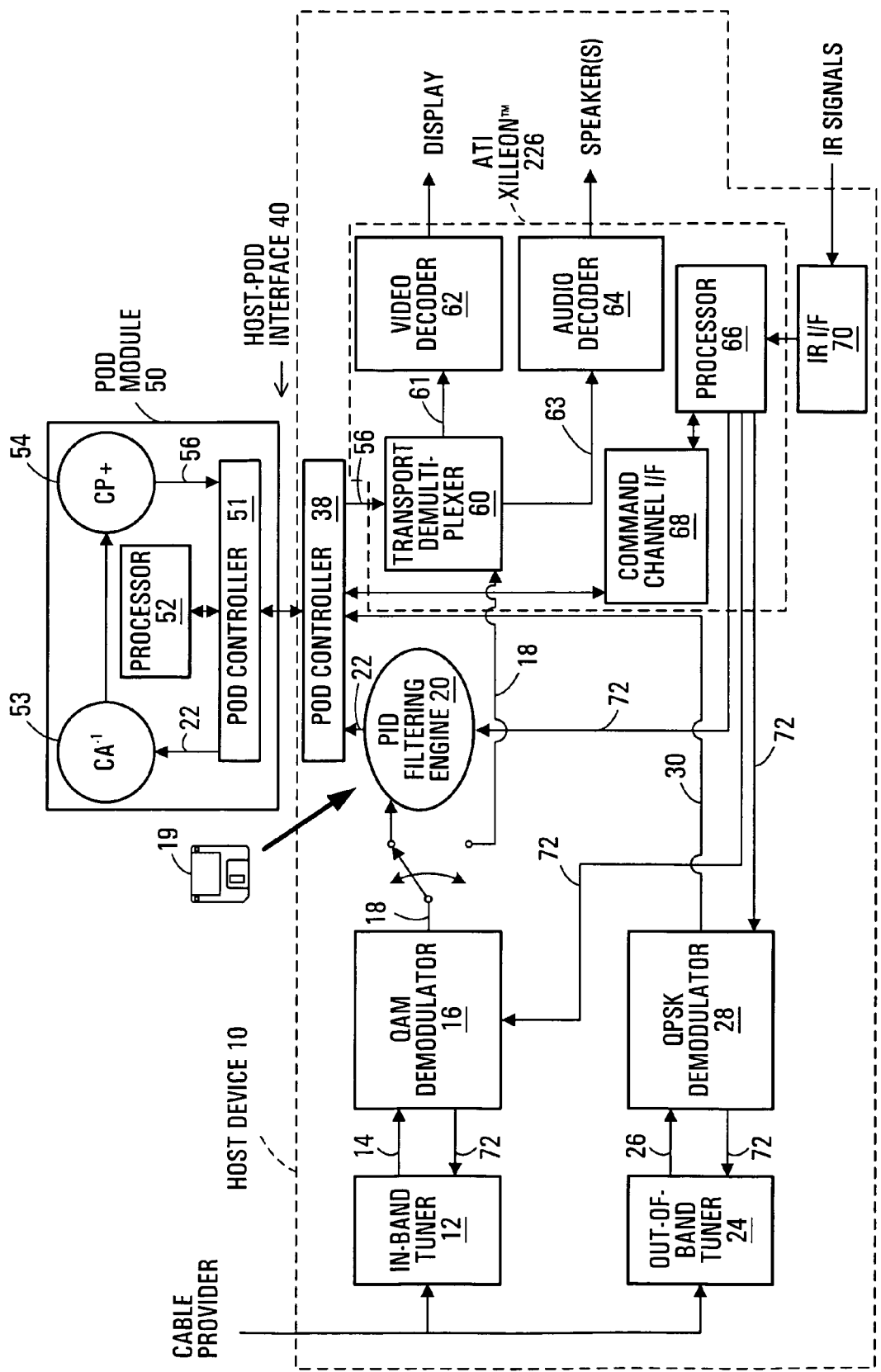
FIG. 1 is a schematic diagram illustrating a host device and interconnected POD module.

FIG. 1 illustrates a host device 10 and interconnected Point-Of-Deployment (POD) security module 50. The host device is digital television (DTV) receiver which in the present embodiment is an integrated digital television unit complete with display (e.g. Liquid Crystal Display (LCD) screen, plasma screen or Cathode Ray Tube (CRT)) and speakers. The host device 10 may for example be a SONY® model KD-34XBR960 (CRT), KD-30XS955 (CRT), KD-34XS955 (CRT), KD-36XS955 (CRT), KDE-37XS955 (Plasma), KDE-42XS955 (Plasma) or KDE-50XS955 (Plasma) digital television. The POD module 50 is a hardware device provided by a cable provider which, when plugged into host device 10, acts as a descrambler, facilitating the display on the host device 10 of digital television programs that are otherwise protected by the cable provider's conditional access (CA) scrambling system. The POD module may for example be a CableCARD™ module from AOL Time Warner™ conforming to the OpenCable CableCARD™ Interface Specification issued Nov. 19, 2004 (document control number OC-SP-CC-IF-118-041119) which is available at www.opencable.com/downloads/specs/OC-SP-CC-IF-I18-041119.pdf and is hereby incorporated by reference hereinto.

As shown in FIG. 1, the host device 10 includes various components comprising an in-band tuner 12, a QAM demodulator 16, a Packet Identifier (PID) filtering engine 20, an out-of-band tuner 24, a Quadrature Phase Shift Keyed (QPSK) demodulator 28, a POD controller 38, a transport demultiplexer 60, a video decoder 62, an audio decoder 64, a processor 66, a command channel interface 68, and an infrared interface 70.

The in-band tuner 12 a component that is responsible for isolating one "major" (6 MHz) channel of the numerous major channels which are received in the form of a modulated RF signal at the host device 10 from the cable provider's network head-end, and for converting the isolated channel to a fixed lower frequency. The term "in-band" refers to video and audio content capable of being viewed/heard by a subscriber, which the in-band tuner 12 is responsible for tuning in. The identity 72 of the major channel to be tuned is received from downstream processor 66 (described below) by way of the QAM demodulator 16 (also described below). The output of the tuner is an analog Forward Application Transport (FAT) channel 14 representative of the tuned major channel. In-band tuners may be implemented using a variety of discrete hardware components such as a MKT47.3 frequency trap saw filter from Murata Manufacturing Co., Ltd. and a UPC3217GV automatic gain control (AGC) amplifier from NEC Corporation for example. In-band tuners are well known to those skilled in the art.

QAM demodulator 16 is a device which converts the FAT channel 14 to a baseband MPEG-2 transport stream 18. Conversion typically involves the steps of Analog-to-Digital Conversion (ADC), QAM demodulation, and forward error correction (FEC). The output of the QAM demodulator 16 is an MPEG-2 transport stream 18, which is a stream of (digital) packets. Depending upon the manner in which the cable provider has employed the bandwidth of the tuned major channel, the MPEG-2 transport stream 18 may include packets representative of a number of different minor channels contained within the major channel. The destination for the output of the QAM demodulator 16 is determined by whether or not the program that has been tuned in by the subscriber is scrambled. If the program is scrambled, the MPEG-2 transport stream 18 output by the QAM demodulator 16 is forwarded to PID filtering engine 20, otherwise the transport stream 18 is forwarded to transport demultiplexer 60. The QAM demodulator 16 receives the identity 72 of the tuned channel from downstream processor 66 (described below). QAM demodulators are defined in ANSI/SCTE 07 Digital Video Transmission Standard for Cable Television and are well known in the art.

PID filtering engine 20 is a hardware, software and/or firmware component responsible for filtering packets representative of digital television programs within the MPEG-2 transport stream 18 to prevent the interception of unscrambled digital television programs at an output of the host device 10 when a scrambled program has been tuned in by in-band tuner 12. PID filtering engine 20 is not a standard component in contemporary host devices, but rather has been incorporated into the present embodiment for the purpose of preventing delivery of unscrambled programs to an output of the host device 10 where they could be intercepted. The engine 20 may for example be a hardware device which compares the PIDs of packets comprising the tuned channel (which PIDs may be "loaded" into the engine 20 upon the tuning of the channel) against the PIDs of packets from the transport stream 18 to determine whether the transport stream packets should be allowed to pass through to the HOST-POD interface 40 unaltered. The identity 72 of the tuned channel is received from downstream processor 66 (described below). The output of PID filtering engine 20 is a filtered MPEG-2 transport stream 22 in which packets representative of unscrambled programs have been removed or changed to thwart interception of unscrambled programs at an output of host device 10 (HOST-POD interface 40 in the present embodiment). As will be appreciated, the filtered stream of packets 22 will lack at least the payload of at least some of the packets representing unscrambled programs, so as to prevent interception of unscrambled programs at the HOST-POD interface 40. The filtered MPEG-2 transport stream 22 is output to a POD controller 38 (described below) for communication to the POD module 50. In the case where PID filtering engine 20 is implemented in software, machine-executable code may be loaded into the host device 10 from a machine-readable medium 19. The machine-readable medium could for example be a removable magnetic or optical disk, a tape, or a Read Only Memory (ROM) chip.

Out-of-band tuner 24 is a component that is responsible for tuning out-of-band content from the currently tuned major channel. The term "out-of-band" indicates that the isolated content represents information other than displayable/playable video/audio content. Out-of-band information may for example include network-specific information, electronic program guides, entitlement management messages, or even firmware updates for purposes up changing the operation of the host device 10 or POD module 50. The identity 72 of the tuned major channel is received from a downstream processor 66 (described below) by way of the QPSK demodulator 28 (also described below). The output 26 of out-of-band tuner 24 is a Quadrature Phase Shift Keyed signal. Out-of-band tuners are well-known in the art and are described in the ANSI/SCTE 55-1 2002 Standard entitled "Digital Broadband Delivery System: Out Of Band Transport Part 1: Mode A" and the ANSI/SCTE 55-2 2002 Standard entitled "Digital Broadband Delivery System: Out Of Band Transport Part 2: Mode B", which are available at www.scte.org/documents/pdf/ANSISCTE5512002DVS178.pdf and www.scte.org/documents/pdf/ANSISCTE5522002DVS167.pdf respectively, and which are each hereby incorporated by reference hereinto.

QPSK demodulator 28 is a component which demodulates the QPSK out-of-band information output by the out-of-band tuner 24. The QPSK demodulator 28 receives the identity 72 of the currently tuned channel from downstream processor 66 (described below). The output of the QPSK demodulator 28 is a provider-specific protocol which is directed to the POD module 50 by way of the HOST-POD interface 40 (described below). QPSK demodulators are well-known in the art.

POD controller 38 is a hardware component which serves as interface between the host device 10 and the POD module 50. POD controller 38 is capable of receiving input from PID filtering engine 20, QPSK demodulator 28, and command channel interface 68 and communicating same over HOST-POD interface 40 to POD module 50. POD controller 38 is also capable of receiving input from POD module 50 and communicating same to components of host device 10 such as transport demultiplexer 60 or command channel interface 68 (both described below). POD controller 38 communicates with POD controller 51 (described below).

Transport demultiplexer 60 is a component which is responsible for receiving an MPEG-2 transport stream, extracting elementary video and audio streams 61 and 63 of the currently tuned channel from the transport stream, recovering the system time clock, and forwarding the elementary video stream 61 and audio stream 63 to an MPEG video decoder 62 and audio decoder 64 (respectively). The MPEG-2 transport stream received by the transport demultiplexer 60 may either be transport stream 18 or transport stream 56. In the case where the program tuned in by the subscriber is unscrambled, the transport demultiplexer 60 receives transport stream 18 directly from QAM demodulator 16, internally within host device 10 (to avoid presentation of unscrambled content to an output of the host device 10). In the case where the tuned program is scrambled, the transport demultiplexer 60 receives transport stream 56 from the POD module 50.

Video decoder 62 is a component which receives an elementary MPEG-2 video stream 61 from transport demultiplexer 60 and decodes it into a format suitable for display. The output format may for example be National Television System Committee (NTSC) composite signal. The output signal may be destined for a graphics engine and a video display processor (neither of which is shown) before being displayed.

Audio decoder 64 is a component which receives an elementary stream 63 of AC-3 (Audio Compression) audio frames from transport demultiplexer 60 and decodes them into Pulse-Code Modulated (PCM) temporal audio samples. The PCM samples may be forwarded to a Digital to Analog Converter (DAC) (not illustrated) for purposes of conversion to analog signals which may be played as sound by conventional speakers. The PCM samples may also be output over a Sony/Philips Digital Interface (S/PDEF) output to an external audio receiver (not illustrated). Audio decoder 64 may also be an MPEG audio decoder.

In some embodiments, transport demultiplexer 60, video decoder 62 and audio decoder 64 may all be components of a system-on-chip integrated circuit. For example, as shown in FIG. 1, the system-on-chip circuit may be an ATI Technologies Inc. Xilleon™ 226 system-on-chip device which also includes processor 66 and command channel interface 68, as well as various other components which are omitted for clarity.

Processor 66 is a microprocessor which communicates with and controls various switches and functional blocks within the host device 10. In the case where the ATI Xilleon™ 226 forms part of host device 10, the processor 66 may be a 300 MHz Reduced Instruction Set Computer (RISC) architecture CPU from MIPS Technologies, Inc. Processor 66 is maintains information regarding the number of programs within the MPEG-2 transport stream 18 representing the currently tuned major channel and of the PIDs associated with the elementary streams comprising each program therein. In the present embodiment, this information is received from processor 52 of POD module 50 in the form of out-of-band Program Association Table and Program Map Tables (described below). Based on input from infrared interface 70, processor 66 is cognisant of the currently tuned major channel (and minor channel, if any) and communicates this information to in-band tuner 12, QAM demodulator 16, and PIED filtering engine 20, as well as to the POD module 50 (by way of command channel interface 68 and POD controller 38 ).

Command channel interface 68 is an interface which facilitates communication between processor 66 and the POD controller module 38. In the case of the ATI Xilleon™ 226, the interface 68 is the proprietary Flexbus interface from ATI Technologies Inc.

Infrared interface 70 is a conventional hardware interface which receives infrared signals from a separate device, such as a handheld, battery-powered remote control, and communicates the received signals to the processor 66. In the present example the received infrared signals represent user commands (e.g. change channel, increase volume, etc.) which may have been generated by the remote control device due to the depressing of remote control buttons by a subscriber.

POD module 50 is a conventional POD security module whose fundamental purpose is to descramble programs (which have been scrambled by the cable provider's conditional access scrambling system) so as to permit them to be viewed by a paying subscriber using host device 10. In FIG. 1, POD module 50 is illustrated in simplified form for clarity. As illustrated, POD module 50 includes a POD controller 51, a processor 52, a conditional access descrambler 53, and a CP+ encryptor 54.

POD controller 38 is capable of receiving input from PID filtering engine 20, QPSK demodulator 28, and command channel interface 68 and communicating same over HOST-POD interface 40 to POD module 50. POD controller 38 is also capable of receiving input from POD module 50 and communicating same to components of host device 10 such as transport demultiplexer 60 or command channel interface 68 (both described below). POD controller 38 communicates with POD controller 51 (described below).

POD controller 51 is a hardware component which serves as interface between the POD module 50 and the host device 10. POD controller 51 is capable of receiving input comprising filtered MPEG-2 transport stream 22 as well as the outputs of QPSK demodulator 28 and command channel interface 68 (described below) from POD controller 38. The POD controller 51 communicates filtered MPEG-2 transport stream 22 to conditional access descrambler 53 and communicates the output of QPSK demodulator 28 and command channel interface 68 to processor 52. The POD controller 51 is also capable of receiving an encrypted MPEG-2 transport stream 56 from CP+ encryptor 54 for communication back to host device 10.

Processor 52 is a microprocessor which communicates with and controls various components within the POD module 50. Processor 52 receives out-of-band network information from QPSK demodulator 28 of host device 10 (via POD controller 38 and POD controller 51) including the number of programs in the MPEG-2 transport stream 18 and the PIDs associated with the elementary streams comprising each program. In the present embodiment, this information takes the form of a Program Association Table and Program Map Tables (described below). This information is relayed to processor 66 of the host device 10, via POD controller 51, POD controller 38 and command channel interface 68. Processor 52 also receives information from processor 66 regarding the currently tuned major channel (and minor channel, if any) via POD controller 51.

Conditional access descrambler 53 is a component which descrambles (i.e. decrypts) any scrambled program that has been tuned by in-band tuner 12 and whose encrypted packets are thus being received within the filtered MPEG-2 transport stream 22 by way of POD controllers 38 and 51.

CP+ encryptor 54 is a component which re-encrypts the program which has been unscrambled (or "descrambled") by the conditional access descrambler 53. The re-encrypted program is provided back to the host device 10 over the HOST-POD interface 40 as an MPEG-2 transport stream 56. Re-encryption may be performed using the Data Encryption Standard (DES) for example. No re-encryption is performed for unscrambled minor channels accompanying a tuned minor channel which was CA scrambled by the cable provider.

It will be appreciated that certain components of the host device 10 and POD module 50 have been omitted from FIG. 1 for clarity.

Figure 2:
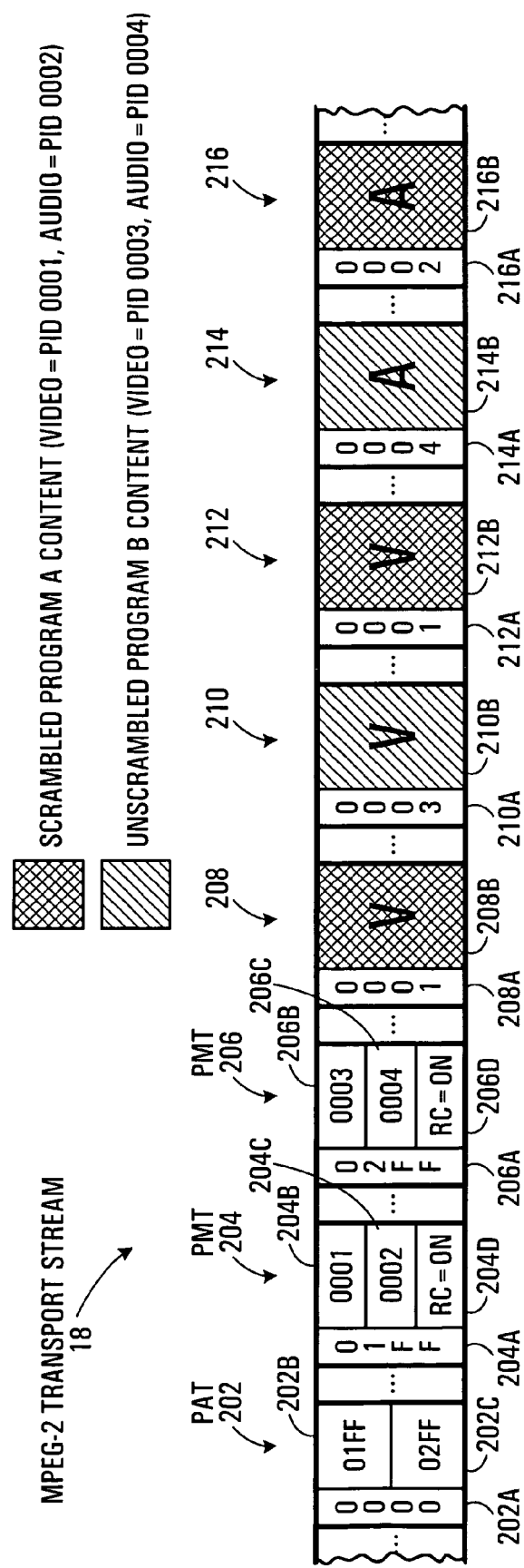
FIG. 2 illustrates an MPEG-2 transport stream representative of a major channel containing one scrambled minor channel and one unscrambled minor channel.

FIG. 2 illustrates the MPEG-2 transport stream 18 output by QAM demodulator 16 of FIG. 1. MPEG-2 transport stream 18 represents a single, 6 MHz major channel transmitted by a cable provider after isolation by the in-band tuner 12 and demodulation by the QAM demodulator 16. As known in the art, an MPEG-2 transport stream is a stream of packets representative of both in-band information (i.e. video and audio) and out-of-band information (i.e. network-specific information, electronic program guides, entitlement management messages, etc.) for the tuned channel. It will be appreciated that the MPEG-2 transport stream 18 shown in FIG. 2 does not contain any packets representing out-of-band information because the in-band tuner 12 filters out such out-of-band information.

As illustrated in FIG. 2, transport stream 18 includes a number of packets 202, 204, 206, 208, 210, 212, 214 and 216. Each of these packets is identifiable by a 13-bit Packet identifier (PID) 202A, 204A, 206A, 208A, 210A, 212A, 214A and 216A respectively. In FIG. 2, the PIDs are written vertically for ease of identification. The PIDs are understood to actually be within a field in a 4-byte MPEG-2 transport packet header (not shown). For clarity, the numbers indicated within the various packets and fields of transport stream 18 of FIG. 2 are in hexadecimal notation.

Packets 202, 204, 206, 208, 210, 212, 214 and 216 may be classified into two categories: program system information (PSI) packets (packets 202, 204 and 206) and video/audio content (transport packets 208, 210, 212, 214 and 216).

PSI packets 202, 204 and 206 are packets used to describe the current number of programs that are being carried by the transport stream 18 and how these programs may be identified within the stream. More specifically, the PSI packets include a Program Association Table (PAT) 202 and two Program Map Tables (PMTs) 204 and 206.

The PAT 202 describes the number of programs in the stream 18 and provides the PID of the PMT for each program (one PMT exists for each program). In the present example, the PAT 202 includes two fields 202B and 202C, indicating that the transport stream 18 carries two programs. The value in first field 202B indicates that the PMT for the first program has a PID of 01FF and the value in second field 202C indicates that the PMT for the second program has a PID of 02FF. In accordance with the above-noted MPEG-2 standard, the PID of the PAT is 0000. The PIDs of the PMTs may vary from those shown in FIG. 2.

The PMT 204 describes the elementary streams comprising a first digital television program ("program A") carried by a first minor channel. PMT 204 has two fields 204B and 204C. The first field 204B indicates that a video elementary stream comprising program A is identifiable by PID 0001, while the second field 204C indicates that an audio elementary stream comprising program A is identifiable by PID 0002. Similarly, PMT packet 206 describes the elementary streams comprising a second program ("program B") carried by a second minor channel, with a first field 206B indicating that a video elementary stream comprising program B is identifiable by PID 0003 and a second field 206C indicating that an audio elementary stream comprising program B is identifiable by PED 0004.

Each of the PMTs 204 and 206 also has a third field 204D and 206D (respectively) containing a Redistribution Control (RC) descriptor. The RC descriptor is essentially an "on" or "off" value indicating whether Redistribution Control is on or off. When Redistribution Control is on, this means that the transmitted content is not to be redistributed and should thus not be output over a digital output without enabling digital output protection technology associated with that digital output (e.g. by applying Digital Transmission Copy Protection (DTCP) scrambling to the stream prior to carriage over a 1394 interface) and shall not be recorded to a storage device without applying an authorized recording method to the compressed stream (e.g. Content Protection Recording Method (CPRM)). When RC is off, no such restriction on redistribution exists. The RC descriptor is set by the cable provider at the network head-end. In the present example, the RC descriptor of both PMT fields 204D and 206D are set to "on", indicating that both of programs A and B are not to be redistributed over the Internet.

It will be appreciated the composition and role of PATs, PMTs and RC descriptors is readily understood by those skilled in the art.

Video/audio content packets (packets 208, 210, 212, 214 and 216) are packets which carry video and audio content comprising a digital television program. Based on the above-described values within fields 204B, 204C, 206B and 206C of PMT packets 204 and 206, it should now be apparent that packets 208, 212 and 216 comprise program A while packets 210 and 214 comprise program B. In FIG. 2, packets containing video content (i.e. packets 208, 210 and 212) are denoted with a uppercase "V", while packets containing audio content (i.e. packets 214 and 216) are denoted with an uppercase "A".

As shown in FIG. 2, Program A is scrambled while Program B is unscrambled. Scrambling (i.e. encryption) is performed by the cable provider at the network head-end. This scrambling may be referred to as Conditional Access (CA) scrambling. The CA scrambling may for example be performed using Motorola® Digicipher® II or Scientific Atlanta PowerKEY® proprietary scrambling techniques. Program A may for example be scrambled because it represents premier content while program B may be unscrambled because it represents a basic tier cable channel. In FIG. 2, packets containing scrambled content are indicated with crosshatching, while packets containing unscrambled content are indicated with hatching.

It should be appreciated that certain fields of the various packets described above, including PAT 202, PMTs 204 and 206, and video/audio content packets 208, 210, 212, 214 and 216, are omitted from FIG. 2 for clarity.

Figure 3:
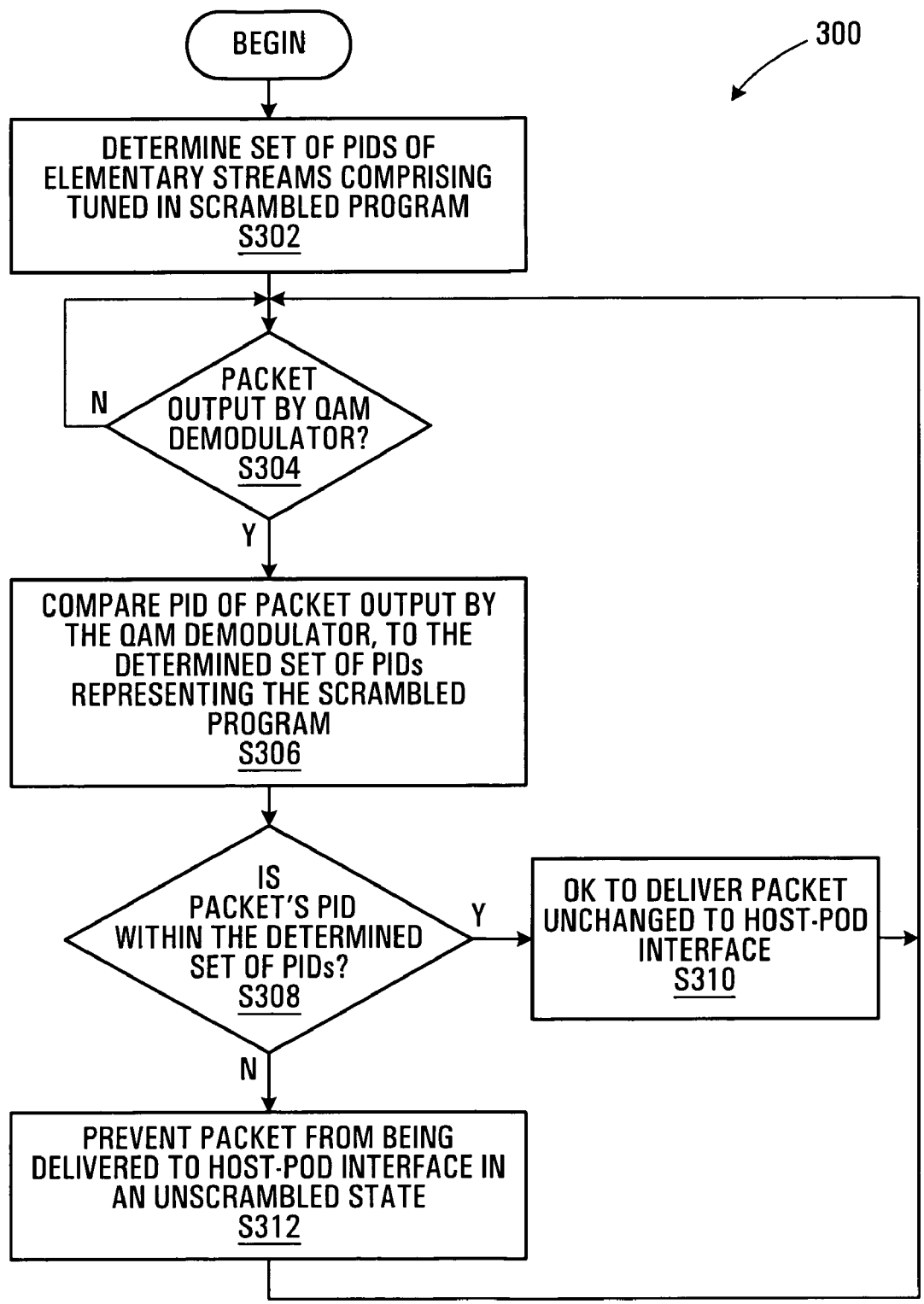
FIG. 3 illustrates operation for preventing delivery of unscrambled programs to an output of a host device.

FIG. 3 illustrates operation 300 of the present embodiment for preventing delivery of unscrambled digital television programs to an output of a DTV receiver. In the present example, it will be appreciated that the output of the DTV receiver is HOST-POD interface 40 of FIG. 1.

For purposes of FIG. 3, it is presumed that a subscriber has used host device 10 to tune in scrambled program A. As described above in conjunction with FIG. 2, scrambled program A is carried by a first minor channel within the major (6 MHz) channel which has been tuned in by the in-band tuner 12 (FIG. 1), which is the same major channel which carries unscrambled program B on a different minor channel.

As shown in FIG. 3, initially the set of packet IDs (PIDs) of the elementary video and audio streams comprising the tuned scrambled program A is determined (S302). In the present embodiment, the determination of S302 entails parsing the PMT packet associated with program A (i.e. PMT 204 of FIG. 2) to extract the PIDs which are associated with the elementary video and audio streams comprising program A (i.e. PIDs 0001 and 0002 respectively). The extracted PIDs form a set of PIDs which is loaded into the PID filtering engine 20.

In particular, processor 66, which is cognisant of the identity of the currently tuned channel and of the PIDs associated with the tuned program, loads the PIDs into the PID filtering engine 20.

During the course of operation of the host device 10, the QAM demodulator 16 demodulates the FAT channel 14 representative of the tuned in major channel. As it does so, the QAM demodulator 16 generates MPEG-2 transport stream 18, which is a stream of packets. For each MPEG-2 transport packet output by the QAM demodulator 16 (S304) and received at the PID filtering engine 20, the PID of the output packet is compared by PID filtering engine 20 to the set of PIDs associated with program A (S306), as determined above.

If the comparison reveals that the PID of the current packet is in fact within the set of PIDs associated with program A (S308), this indicates that the current packet is a scrambled video or audio packet containing program A content. Because the packet is scrambled, it is acceptable for the packet to be delivered from the PID filtering engine 20 to the HOST-POD interface 40 (FIG. 1), by way of POD controller 38, for processing at the POD module 50 (S310). POD module processing includes descrambling 53, CP+ encryption 54, and forwarding of the packet back to host device 10, for further processing resulting in the display of program A on host device 10.

If, on the other hand, the comparison in S308 reveals that the PID of the current packet is not within the set of PIDs associated with scrambled program A, this indicates that the current packet may not be scrambled. For example, in the present example, the packet may be an unscrambled video or audio packet containing program B content. If the packet represents an unscrambled program, it would not be acceptable for the packet to be delivered to the HOST-POD interface 40, assuming that the RC descriptor associated with the program has a setting which precludes redistribution of the program via the Internet (as is the case for program B—see field 206D of packet 206 in FIG. 2). Accordingly, action is taken to prevent the packet from being delivered to HOST-POD interface 40 in an unscrambled state (S312). It is noted that this action is taken regardless of the setting of the RC descriptor, which is only determined at the downstream transport demultiplexer 60. Advantageously, interception of unscrambled program B at HOST-POD interface 40 and unauthorized redistribution of same may thus be thwarted.

In the present embodiment, the action taken in S 312 to prevent delivery of the packet to the HOST-POD interface 40 in an unscrambled state comprises overwriting the payload of the packet with a null payload. The packet header and adaptation field are left unchanged. (As known in the art, the adaptation field an optional MPEG-2 transport packet field containing a variety of timing and control data.) The same constant time delay should be added to each packet in order to maintain inter-packet timing relationships.

It will be appreciated that the processing which occurs in S312 may be conditional on a determination that the RC descriptor associated with the program which the current packet comprises has a setting which precludes redistribution of the program on the Internet. However, this is not a requirement.

Regardless of which one of S310 or S312 is performed, the packet is forwarded from by the PID filtering engine 20 to the HOST-POD interface 40. Thereafter, processing of the packet at the POD module 50 and then at the transport demultiplexer 60, video decoder 62 and/or audio decoder 64, occurs in a conventional fashion.

Operation 300 repeats at S304 for the each transport packet output by the QAM demodulator 16. This continues until the subscriber changes the channel.

When a subscriber changes the channel using host device 10, subsequent operation is determined by whether or not the tuned program is scrambled or unscrambled. If the tuned program is scrambled, PIDs are extracted and loaded into the PID filtering engine 20 and operation 300 is re-initiated at S302, in view of the fact that the set of PIDs comprising the tuned scrambled program will have changed. The remaining operation 300 is as described above.

If the channel newly tuned in by the subscriber is unscrambled, operation 300 is not performed, as the MPEG-2 transport stream 18 output by the QAM demodulator 16 in that case will bypass PID filtering engine 20, instead being routed directly to the transport demultiplexer 60 and downstream components for processing in a conventional manner.

As will be appreciated by those skilled in the art, modifications to the above-described embodiments can be made without departing from the essence of the invention. For example, host device 10 is not necessarily an integrated DTV, but instead may be a set-top box or other type of DTV receiver.

In another alternative, the processing which occurs in S312 of FIG. 3 to prevent a transport packet associated with a program that is not presently tuned in from being delivered to an output of the host device 10 in an unscrambled state may be something other than overwriting the payload of the packet in question with a null payload. For example, the packet payload may be overwritten with others forms of innocuous packet payload (e.g. the adapdation field could be padded with "FFs" (hex)). Of course, the PID filtering engine 20 should add the same constant time delay to each packet in order to maintain inter-packet timing relationships. Alternatively, the PID filtering engine 20 may simply discard packets with non-matching PIDs. In this case, the PID filtering engine 20 should replace the original Program Clock Reference (PCR) values stored in the adaptation field of any undiscarded MPEG-2 transport packets having an adaptation field with a locally generated PCR value, in order to maintain inter-packet timing relationships.

In another alternative, the processing which occurs in S312 may be conditional on a determination that the packet in question is not already scrambled, since delivery of a scrambled packet to the output of the host device does not pose a security concern. If the packet is scrambled, it may be passed through to the HOST-POD interface 40 by PID filtering engine 20 without modification.

It will be appreciated that the assessment performed in S308 and prevention performed in S312 may not need to be performed for packets within the transport stream which do not represent program content, such as PSI packets.

It should also be appreciated that the filtering performed by the PID filtering engine 20 could alternatively be designed to occur within the QAM demodulator 16. In another alternative, this processing could be designed to be part of the POD controller 38 of the host device 10.

Fundamentally, the described operation may be performed to prevent delivery of unscrambled digital television programs to an output of a DTV receiver in any situation in which an unscrambled program is being carried by a stream of packets which also carries a scrambled program that is currently tuned-in by a host device. Operation generally entails ascertaining a characteristic that uniquely identifies within the stream of packets a subset of packets representing scrambled program content (e.g. inclusion of certain PID values or some other characteristic) and preventing packets representing program content within the stream of packets which do not have that characteristic from being delivered to an output of the DTV receiver in an unscrambled state.

Other modifications will be apparent to those skilled in the art and, therefore, the invention is defined in the claims.

What is claimed is:

1. A method of processing digital television programs at a receiver, comprising:
    receiving a digital stream containing a first set of packets representing content of a scrambled program currently tuned by said receiver and a second set of packets representing content of an unscrambled program, said receiving resulting in a received stream;
    filtering said received stream to form a filtered stream to be provided to a descrambler, said filtered stream containing both said first set of packets and said second set of packets in a changed form wherein a payload of each packet of said second set has been changed, said changed payloads preventing interception of said unscrambled program at an interface to said descrambler; and
    providing said filtered stream, including said second set of packets in said changed form, to said descrambler via said interface for descrambling said scrambled program,
    wherein said filtering comprises, for each packet in said stream of packets representing program content:
        determining whether said packet is in said first set; and
        if said packet is not within said first set, changing a payload of said packet.

2. The method of claim 1 wherein said changing a payload of said packet comprises overwriting said payload with a null payload.

3. The method of claim 1 wherein said determining comprises assessing whether a packet identifier (PID) of said packet matches any PID within a set of PIDs unique to said first set of packets.

4. The method of claim 1 wherein said determining and said changing is performed only for packets representing unscrambled program content.

5. The method of claim 1 wherein said filtering comprises, for each packet in said stream of packets representing program content:
  determining whether said packet is in said first set by assessing whether a packet identifier (PID) of said packet matches any PID within a set of PIDs unique to said first set of packets.

6. The method of claim 1 wherein said descrambler is a removable point-of-delivery (POD) security module.

7. The method of claim 1 wherein said stream of packets is an MPEG-2 transport stream.

8. A method of processing digital television programs at a receiver, comprising:
  receiving a stream of packets representing a major channel comprising a plurality of minor channels, one of said plurality of minor channels carrying a first set of packets representing a scrambled program currently tuned by said receiver, another of said plurality of minor channels carrying a second set of packets representing an unscrambled program;
  determining a set of packet identifiers (PIDs) which uniquely identifies said first set of packets, said determining resulting in a determined set of PIDs;
  filtering said stream to form a filtered stream to be provided to a descrambler, said filtered stream containing both packets whose PIDs are in said determined set of PIDs and packets whose PIDs are not in said determined set of PIDs in a changed form wherein a payload of each said packet has been changed, said changed payloads preventing interception of said unscrambled program at an interface to said descrambler; and
  providing said filtered stream, including said packets in said changed form, to said descrambler via said interface for descrambling said scrambled program,
  wherein said filtering comprises, for each packet in said stream of packets representing program content:
    determining whether said packet is in said first set; and
    if said packet is not within said first set, changing a payload of said packet.

9. A non-transitory machine-readable medium storing code for processing digital television programs at a receiver, said code, upon execution by said receiver, causing said receiver to:
  receive a digital stream containing a first set of packets representing content of a scrambled program currently tuned by said receiver and a second set of packets representing content of an unscrambled program, said receiving resulting in a received stream;
  filter said received stream to form a filtered stream to be provided to a descrambler, said filtered stream containing both said first set of packets and said second set of packets in a changed form wherein a payload of each packet of said second set has been changed, said changed payloads preventing interception of said unscrambled program at an interface to said descrambler; and
  provide said filtered stream, including said second set of packets in said changed form, to said descrambler via said interface for descrambling said scrambled program,
  wherein said filtering comprises, for each packet in said stream of packets representing program content:
    determining whether said packet is in said first set; and
    if said packet is not within said first set, changing a payload of said packet.

10. The machine-readable medium of claim 9 wherein said changing a payload of said packet comprises overwriting said payload with a null payload.

11. The machine-readable medium of claim 9 wherein said determining comprises assessing whether a packet identifier (PID) of said packet matches any PID within a set of PIDs unique to said first set of packets.

12. The machine-readable medium of claim 9 wherein said determining and said changing is executed only for packets representing unscrambled program content.

13. The machine-readable medium of claim 9 wherein said filtering comprises:
  for each packet in said stream of packets representing program content:
    determining whether said packet is in said first set by assessing whether a packet identifier (PID) of said packet matches any PID within a set of PIDs unique to said first set of packets.

14. The machine-readable medium of claim 9 wherein said descrambler is a removable point-of-delivery (POD) security module.

15. The machine-readable medium of claim 9 wherein said stream of packets is an MPEG-2 transport stream.

16. A receiver operable to process digital television programs, comprising:
  a filtering engine for:
    receiving a digital stream containing a first set of packets representing content of a scrambled program currently tuned by said receiver and a second set of packets representing content of an unscrambled program, said receiving resulting in a received stream;
    filtering said received stream to form a filtered stream to be provided to a descrambler, said filtered stream containing both said first set of packets and said second set of packets in a changed form wherein a payload of each packet of said second set has been changed, said changed payloads preventing interception of said unscrambled program at an interface to said descrambler; and
    providing said filtered stream, including said second set of packets in said changed form, to said descrambler via said interface for descrambling said scrambled program,
    wherein said filtering comprises, for each packet in said stream of packets representing program content:
      determining whether said packet is in said first set; and
      if said packet is not within said first set, changing a payload of said packet.

17. The receiver of claim 16 wherein said changing a payload of said packet comprises overwriting said payload with a null payload.

18. The receiver of claim 16 wherein said determining comprises assessing whether a packet identifier (PID) of said packet matches any PID within a set of PIDs unique to said first set of packets.

19. The receiver of claim 16 wherein said determining and said changing is performed only for packets representing unscrambled program content.

20. The receiver of claim 16 wherein said filtering comprises, for each packet in said stream of packets representing program content:
  determining whether said packet is in said first set by assessing whether a packet identifier (PID) of said packet matches any PID within a set of PIDs unique to said first set of packets.

21. The receiver of claim 16 wherein said descrambler is a removable point-of-delivery (POD) security module.

22. The receiver of claim 16 wherein said stream of packets is an MPEG-2 transport stream.

* * * * *